(12) United States Patent
Fan (10) Patent No.: US 7,414,996 B2
(45) Date of Patent: Aug. 19, 2008

(54) ADDRESS AUTOCONFIGURATION IN AD HOC NETWORKS

(75) Inventor: Zhong Fan, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 859 days.

(21) Appl. No.: 10/777,658

(22) Filed: Feb. 13, 2004

(65) Prior Publication Data

US 2004/0240474 A1 Dec. 2, 2004

(30) Foreign Application Priority Data

Feb. 21, 2003 (GB) ................................. 0304007.8

(51) Int. Cl.
*H04Q 7/24* (2006.01)
(52) U.S. Cl. ..................................... 370/338
(58) Field of Classification Search ................. 370/338, 370/392–393, 465–466
See application file for complete search history.

(56) References Cited

U.S. PATENT DOCUMENTS

| 6,282,577 | B1 |   | 8/2001 | Okanoue et al. |         |
|-----------|----|---|--------|----------------|---------|
| 6,907,257 | B1 | * | 6/2005 | Mizutani et al.| 455/464 |
| 7,016,336 | B2 | * | 3/2006 | Sorensen       | 370/351 |
| 7,075,897 | B2 | * | 7/2006 | Uematsu        | 370/255 |
| 2004/0167988 | A1 | * | 8/2004 | Rune et al. | 709/238 |

FOREIGN PATENT DOCUMENTS

EP           1 093 254 A2      4/2001

OTHER PUBLICATIONS

R. Hinden, et al., "IP Version 6 Addressing Architecture RFC2373 The Internet Society", Network Working Group, XP-002901680, Jul. 1998, pp. 1-18.
Kilian Weniger, et al., "IPv6 Autoconfiguration in Large Scale Mobile Ad-Hoc Networks", Proceedings of European Wireless, XP-002283699, 2002, pp. 1-7.
S. Thomson, et al., "IPv6 Stateless Address Autoconfiguration-rfc2462", Network Working Group Request for Comments, XP-002258664, Dec. 1998, pp. 1-25.
Zhong Fan., IPv6 Stateless Address Autoconfiguration in Ad Hoc Networks, Lecture Notes in Computer Sciences, vol. 2775, XP-002283701, Sep. 25, 2003, pp. 665-678.

* cited by examiner

*Primary Examiner*—Chi H. Pham
*Assistant Examiner*—Thai Hoang
(74) *Attorney, Agent, or Firm*—Oblon, Spivak, McClelland, Maier & Neustadt, P.C.

(57) ABSTRACT

The invention provides a system whereby a node can configure itself automatically with an address when it joins or establishes a network. Once the network is established, the nodes within that network exchange hello messages that are modified to give an indication of the network to which the nodes belongs. If two networks begin to merge with each other then the nodes at the edge of that network will receive hello messages from nodes which identify two different networks. When this occurs, the node can determine that network merging is occurring and carry out the process of duplicate address detection to ensure the uniqueness of its address within the entire combined network.

17 Claims, 5 Drawing Sheets

Standard NS

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Version | | | | Priority | | | | | | | | | | | | Flow label | | | | | | | | | | | | | | | |
| Payload Length | | | | | | | | | | | | | | | | Next Header | | | | | | | | Hop Limit: 255 | | | | | | | |
| Source address | | | | | | | | | | | | | | | | | | | | | | | | | | | | | | | |
| unspecified address | | | | | | | | | | | | | | | | | | | | | | | | | | | | | | | |
| Destination address | | | | | | | | | | | | | | | | | | | | | | | | | | | | | | | |
| solicited-node multicast address | | | | | | | | | | | | | | | | | | | | | | | | | | | | | | | |
| Type | | | | | | | | Code | | | | | | | | | | | | | | | | Checksum | | | | | | | |
| Reserved | | | | | | | | | | | | | | | | | | | | | | | | | | | | | | | |
| Requested IPv6 Address: | | | | | | | | | | | | | | | | | | | | | | | | | | | | | | | |
| site-local address | | | | | | | | | | | | | | | | | | | | | | | | | | | | | | | |

Figure 5a

AREQ - Modified NS

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|
| Version | | | | Priority | | | | | | | | | | | | Flow label | | | | | | | | | | | | | | | |
| Payload Length | | | | | | | | | | | | | | | | Next Header | | | | | | | | Hop Limit: N.D. | | | | | | | |
| Source address | | | | | | | | | | | | | | | | | | | | | | | | | | | | | | | |
| temporary site-local address | | | | | | | | | | | | | | | | | | | | | | | | | | | | | | | |
| Destination address | | | | | | | | | | | | | | | | | | | | | | | | | | | | | | | |
| all nodes multi-cast address | | | | | | | | | | | | | | | | | | | | | | | | | | | | | | | |
| Type | | | | | | | | Code | | | | | | | | | | | | | | | | Checksum | | | | | | | |
| M | N | | | | | | | | | | | | | | | | | Reserved | | | | | | | | | | | | | |
| Requested IPv6 Address: | | | | | | | | | | | | | | | | | | | | | | | | | | | | | | | |
| site-local address | | | | | | | | | | | | | | | | | | | | | | | | | | | | | | | |

Figure 5b

ADDRESS AUTOCONFIGURATION IN AD HOC NETWORKS

FIELD OF THE INVENTION

The present invention relates to automatic configuration of a network terminal to identify a suitable network address. In particular, the present invention relates to autoconfiguration in mobile ad hoc networks using IPv6.

BACKGROUND OF THE INVENTION

When a terminal connects to a network, particularly an ad hoc network such as a network of mobile devices, it needs to determine a suitable network address to facilitate the communication with other terminals or nodes connected to the network. With the IP (Internet Protocol) there are various facilities to allow a terminal to determine a suitable network address. In IPv4 (Internet Protocol version 4) addresses are becoming scarce due to the way in which addresses are allocated and the increasing demand for new addresses. Allocation must be carefully controlled and so addresses are either manually allocated to a terminal by an administrator or they may be allocated using DHCP (Dynamic Host Configuration Protocol). DHCP requires a DHCP server which maintains a database of available addresses. When a terminal connects to the network, it requests an available address from the DHCP server. The DHCP server then allocates an IP address to the network terminal. However, this technique requires a DHCP server to be available to the newly connecting terminal and also requires the DHCP server to maintain a list of available addresses. In order to provide high flexibility and the ability for a new terminal to connect to networks freely then a large number of DHCP servers would be needed, each with a store of unique available addresses. An ad-hoc network is essentially one without infrastructure, in which case DHCP is not possible. Making a DHCP server available would require infrastructure and so limit the flexibility of an ad-hoc network.

In IPv6, a later version of the IP protocol, the potential number of addresses available is vastly greater than that under IPv4. Whilst this overcomes the problem of the limitation of the number of potential addresses available, it is still inconvenient to have a separate server to store available addresses to be allocated to a terminal upon request. It is therefore desirable to allow a terminal to configure itself with an IP address without the need for a separate server to allocate addresses.

Various systems have been proposed for allowing IP address autoconfiguration in ad hoc networks. In the paper entitled "IP Address Autoconfiguration for Ad Hoc Networks" by Charles E Perkins et al for the 'Mobile Ad Hoc Networking Group' of the Internet Engineering Task Force (IETF) [14 Nov. 2001], a mechanism is described by which a terminal or node in an ad hoc network may autoconfigure itself with an IP address which is unique throughout the connected portion of the ad hoc network.

The Perkins et al document describes a system in which a terminal performing autoconfiguration picks two addresses, a temporary one and the tentative address which it wishes to use. The temporary address is used only briefly in order to determine the uniqueness of the tentative address. In order to determine whether the tentative address is unique, the terminal sends out an address request (AREQ). If it receives an address reply (AREP) then it knows that the tentative address is not unique. If no AREP is received, the tentative address is deemed to be unique. For IPv6 the AREQ is a modified neighbour solicitation (NS) message. The neighbour solicitation message is modified with a flag to indicate that it is acting as part of a duplicate address detection (DAD) operation rather than its normal function as a neighbour communication message. Consequently when a neighbour solicitation message is received in which the flag is set, the message is passed on by a node as opposed to normal where the message only travels to neighbours that are one hop away from it.

A terminal which receives a neighbour solicitation message indicating a tentative address which corresponds to its own address issues an address reply (AREP) message in the form of a modified neighbour advertisement (NA) message. The neighbour advertisement message is modified with a flag similar to the neighbour solicitation message to indicate that the neighbour advertisement message is acting as part of a duplicate address detection (DAD) process. This NA message is similarly passed from node to node rather than simply only travelling one hop to its immediate neighbours. In this way, the modified NA message will be distributed back to the original sender of the NS message so that it knows that the tentative address is not unique. The tentative address is initially selected by providing a suitable prefix from a site-local prefix and appending to that a number from the terminal itself. This may be a random number or a number based upon some characteristic of the terminal such as its MAC number or its extended universal identity number (EUI-64). Whilst these numbers are intended to be unique to a terminal or its network card, there is still a possibility that an address formed in this way will not be unique.

Perkins et al indicates that when a network coalesces with another network, duplicate address detection (DAD) would need to be performed although no technique for detecting when network coalescence takes place or how the initiation of DAD would take place, is indicated in the document.

The paper entitled "IPv6 Autoconfiguration in Large Scale Mobile Ad Hoc Networks" by Kilian Weniger and Martina Zitterbart of the University of Karlsruhe from 'Proceedings of European Wireless' (2002) proposes a hierarchical approach to address autoconfiguration. The paper considers the applicability of IPv6 and its stateless address autoconfiguration to large-scale mobile ad hoc networks. Nodes in mobile ad hoc networks are integrated hosts and routers. As a consequence, all nodes execute all router functionalities. In order to apply IPv6 stateless address autoconfiguration in environments other than single broadcast links, routers which issue router advertisements (RA) are needed. However, during duplicate address detection (DAD), it is necessary to flood the network with the messages. This flooding leads to congestion and, as the size of the network increases, the congestion becomes unacceptable. Weniger et al describes a system which attempts to limit flooding by each terminal defining its broadcast link as the group of nodes that are less than a certain number of hops away from it. To achieve this, a hierarchy is established using a leader node that configures a group of its neighbour nodes by issuing router advertisements. In this way, the neighbour nodes do not need to carry out their router functions and the associated outputting of RA messages and so the necessary traffic is reduced. However, the initial election and subsequent re-election of the leaders is complex and duplicate address detection has to be performed periodically to deal with network partitioning and merging which adds further complexity to the protocol.

Therefore there is a need to provide a network protocol which allows for stateless address autoconfiguration which avoids complex hierarchical structure and which is able to deal with the dynamic nature of mobile networks in particular where network partitioning and merging occurs regularly. In addition, it is preferable to provide an address selection technique which provides site-local addresses rather than link-local addresses to reduce the likelihood of address duplication.

SUMMARY OF THE INVENTION

Therefore according to the present invention there is provided a method for controlling a node in a network comprising: storing a network identifier indicative of the network which the node is associated with; receiving messages from other nodes and extracting network identifiers from said messages indicative of the network which the sending node is associated with; comparing the received network identifier with the stored network identifier; and carrying out a duplicate address detection process where the stored network identifier is different to the received network identifier.

The present invention further provides a terminal for connecting to a network to form a node comprising: a memory for storing a network identifier indicative of the network which the node is associated with; a receiver for receiving messages from other nodes and extracting from said messages a network identifier indicative of the network which the sending node is associated with; a comparator for comparing a received network identifier with the stored network identifier; and a controller for carrying out a duplicate address detection process where the comparator indicates that the stored network identifier is different to the received network identifier.

Preferably the duplicate address detection process includes sending an address request message for reception by other nodes, wherein said address request message includes a flag to indicate that the duplicate address detection process being carried out by the node is as a result of the received network identifier being different to the stored network identifier. The flag helps to indicate to other nodes that merging of two nodes has taken place.

It is therefore beneficial if a node, when receiving an address request message with such a flag, initiates its own duplicate address detection (DAD) process. However, to avoid a storm of DAD messages, it is preferable to defer the start of the duplicate address detection process for a period of time. This period of time may be determined at random or be based on some parameter that ensures that it is different to other nodes in the network, which may be similarly about to commence a DAD process.

In order to ensure that all nodes in a network are aware of a merging situation, it is advantageous if the address request messages issued as part of the DAD process are passed from node to node. However, to reduce retransmission of previous messages or echoes, the nodes may keep a record of messages already forwarded and not retransmit messages that originated from the same node. The record of the messages may be retained for a limited period so that future DAD processes are not affected.

As part of the initiation of a node, it must first establish a unique address and then obtain and store a network identifier. If the node is not close to any other nodes i.e. it is not able to join an existing network then it may determine its own network identifier and effectively establish its own network. The network identifier may be based upon the terminals own EUI-64 or MAC address, or even simply selected at random.

If a node initialises itself and there is one or more other nodes around then it can join the existing network. The other nodes should send out messages such as hello messages which will identify the network identifier of that node. The new node can then store the received network identifier as it own. This process may be carried out by initially waiting to see if hello messages are received and using the received network identifier but if no message is received within a period of time, the node determines that it is alone and establishes its own network identifier.

In addition, during initial address configuration, the terminal preferably selects its address by using a site-local prefix, followed by a subnet identity, followed by a code related to the terminal's interface identity (e.g. EUI-64 or MAC address). Preferably the site-local prefix is FEC0:0:0::/48. The subnet identity is preferably a 16-bit number. This number may be randomly generated and preferably excludes the value FFFF.

The provision of a unique network identifier maintained by each node in the network and changed via hello messages between neighbours, provides the ability to detect when networks are merging so that the appropriate DAD procedure can be carried out to avoid any possible conflict of addresses. This allows network merging to be handled without the need for complex hierarchical structures and without excessive flooding of the networks.

In accordance with an alternative aspect of the present invention there is provided a method of forming an IPv6 address for use by a terminal forming a node in an ad hoc network comprising: using a site-local prefix to form the prefix of the address; generating a random number as a subnet identifier; obtaining a predetermined terminal identifier address; and forming said address by appending the subnet identifier to the end of the prefix and appending the terminal identifier address to the end of the combined prefix and subnet identifier. Having formed the address, the address is preferably stored for subsequent use.

Throughout this specification, references to a terminal relate to a device that is capable of connecting to a network and forming a node. This may be a network card or a device comprising such a card or other means to connect to a network. Reference to a node refers to a point of connection in a network but also applies to the situation where a terminal is unable to establish a contact with any other node and is thus a sole node in a one-node network.

BRIEF DESCRIPTION OF THE DRAWINGS

A specific embodiment of the present invention will now be described with reference to the attached figures in which.

DETAILED DESCRIPTION

Figure 1:
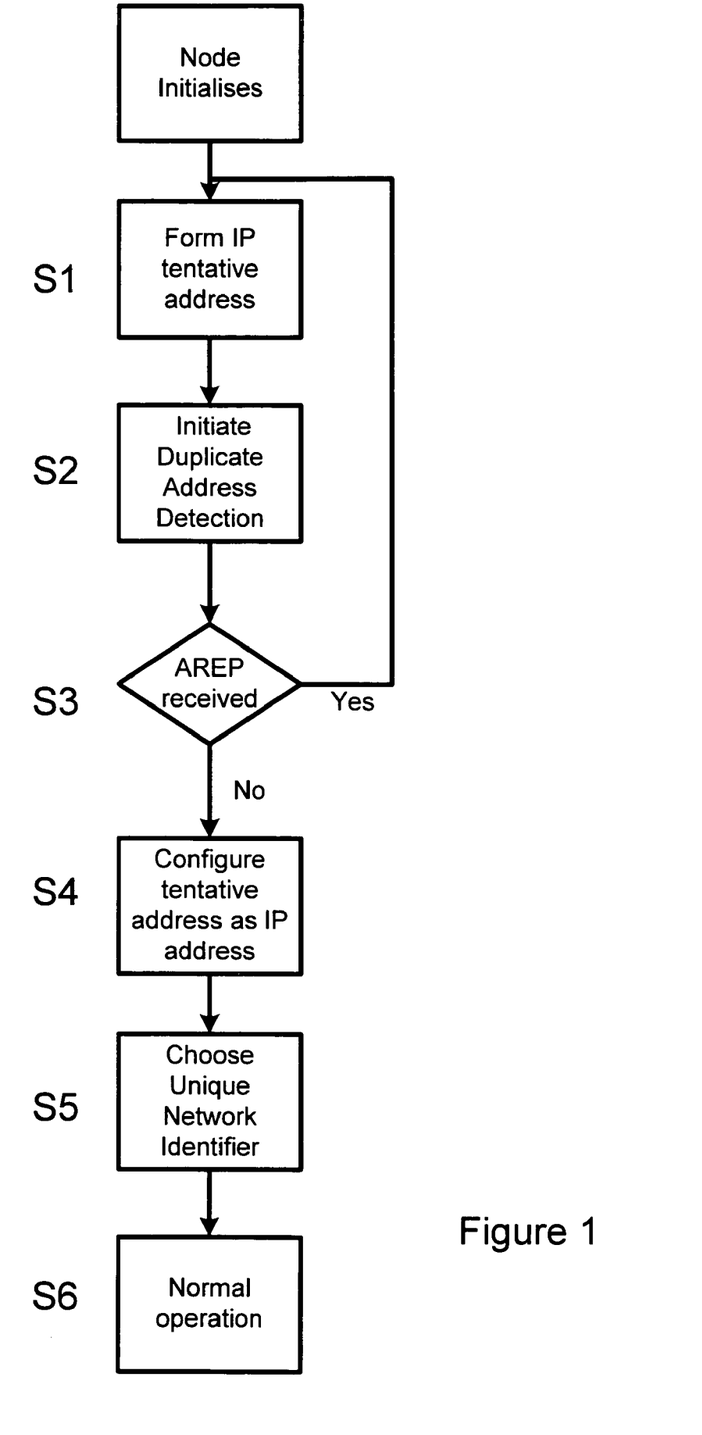
FIG. 1 shows the initial address establishing and confirmation procedure.

The process of initialising a terminal to form a node is described with reference to FIG. 1. When a terminal is first initiated to join a network, it will find itself in one of two situations. Either there will be an existing network which it can join or there will be no existing network in which case it effectively forms its own new network. In either case, the terminal must determine an IPv6 address (S1) for use on the network.

Since an ad hoc network is a multi-hop environment, it should be considered as a site rather than a link. Consequently the IPv6 address for a new node is a site-local address. In this embodiment, the site-local address consists of four fields. These include a 10-bit site-local format prefix (FEC0::/10), a 38-bit field of all zeros, a 16-bit subnet ID and a 64-bit interface ID. The subnet ID is selected randomly from a determined range of values. In general, this range would allow any 16-bit value. In practice, some values are avoided, including the value FFFF (which corresponds to the MANET_INITIAL_PREFIX). The MANET_INITIAL_PREFIX (FEC0:0:0:FFFF::/96) serves a special purpose as described below.

The interface ID is generated from the node's link-layer address. For example, the interface ID may be formed from the network cards IEEE Extended Universal Identifier (EUI-64) which in turn may be based upon the card's MAC address. Since EUI-64 and MAC addresses are intended to be globally unique, this approach minimizes the possibility of duplicate addresses being assigned to two different nodes. However, due to non-compliance of some organisations, it is possible for duplication to occur.

For example, a device having an EUI-64 value of 1:21FF:FE63:7135 would provide an interface ID of 201:21FF:FE63:7135. A randomly generated subnet ID is provided as ABCD. As indicated above, a site-local prefix can be used to generate the final site-local IPv6 address as FEC0::ABCD:201:21FF:FE63:7135.

Having determined a tentative address, the terminal needs to take steps to establish whether it is genuinely unique. In order to confirm the validity of the tentative address which has been determined. The node must therefore carry out a duplicate address detection (DAD) process (S2). An address request (AREQ) is sent out in the form of a modified neighbour solicitation message. So that the message is passed beyond the immediate neighbours, the message includes a flag (M) indicating that it is acting as an AREQ message rather than a simple solicitation message.

In response to the receipt of such a message, a neighbour terminal will pass the message on to its own neighbours. A comparison to its own address will also be carried out and if the address is the same as its own address, an address reply (AREP) message will be sent back, ultimately to the original terminal, to advise it that its tentative address is not unique and will need to be changed.

The AREP message similarly utilises a modified neighbour advertisement (NA) message which has an additional flag that indicates that the NA message is being used as part of a duplicate address detection operation so that it is passed on from node to node rather than being restricted to only being sent over one hop to the immediate neighbours. The tentative address is included in the NA message such that when the original sender of the address request receives the network advertisement message including its tentative address, it knows that its tentative address is not unique. It can then begin the process of determining an alternative tentative address, for example based upon a different randomly selected subnet ID.

Having sent out the AREQ message, the node must wait to see if an AREP message is received in reply (S3). If an AREP message is received from a node which is currently using the tentative address, then a new tentative address must be established and duplicate address detection must be repeated with the new address.

Once a tentative address has been selected and no AREP messages are received within a fixed period of time, the terminal determines that the tentative address is not already in use and can therefore use that address for itself. The duplicate address detection process is described in greater detail in the above-referenced document by Perkins et al.

After performing duplicate address detection the terminal initially assumes that there is no network in the area and that it is the sole node in a new network. It will then configure itself (S4) with the determined tentative address and the network is initialised. If the node receives no messages from any other nodes then it proceeds on the basis that it has established a new network and initially chooses (S5) a unique network identifier (UNID) for this new network and stores it. This unique identifier helps to identify the nodes which are connected to a given network. This is particularly useful for determining when network partitioning and merging takes place. As part of the normal operational process of the network, hello messages are sent out periodically to neighbours and the unique identifier is included in these hello messages.

The unique identifier may be determined in a number of ways or may simply be based upon the node's EUI-64 or MAC address.

Where a terminal is initialised and a network already exists then one of its neighbours can send out a hello message. As described above, the hello message will include the unique identifier for the network that the neighbour forms part of. The new node will receive this message and determine that it is able to join an existing network rather than establish a new one. The node therefore chooses (S5) to use the unique identifier received from its neighbour and stores the unique identifier instead of generating its own. In future, as explained below, the node will send out this unique identifier as part of hello messages which it transmits. In this way all the nodes on a given network will maintain the same unique identifier.

Once the node has initialised itself with an IP address and determined a unique identifier, either from a neighbour or on its own, normal operation (S6) continues but the status of the network needs to be monitored to determine if network partition or merging has taken place. This is explained with reference to FIG. 2.

Figure 2:
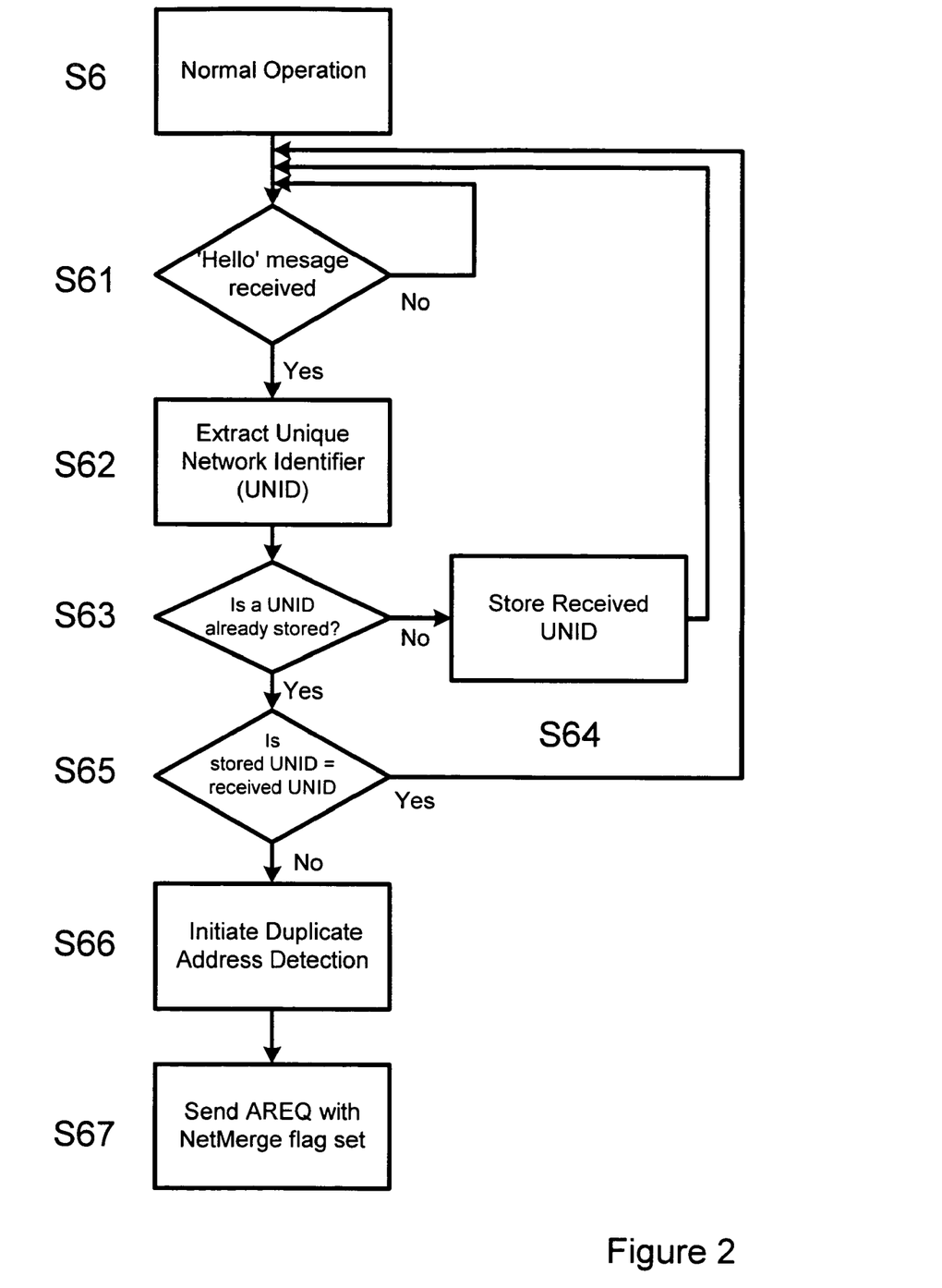
FIG. 2 shows monitoring by a terminal to determine whether network merging has taken place.

During network partition, one or more of the nodes forming part of the network become disconnected from the other nodes forming the network. In a mobile network, this may be because the nodes have moved apart or are no longer able to communicate with nodes in the other part of the network. During merging, the nodes in two networks, i.e. networks with different unique identifiers are able to communicate where they were not able to before. The problem here is that two nodes may potentially have the same IP address even though each node separately authenticated the address as unique within its own network prior to merging of the networks. Of course prior to merging, the two networks would not have been able to communicate and so the AREQ messages would not have passed between the two networks. However, once merging has taken place, the existence of two nodes with the same address is problematic.

In ad hoc networks, network connectivity is determined by the reception of broadcast control messages. These broadcast control messages also serve as hello messages, indicating to neighbours the existence and continued presence of a node. Hello messages are exchanged periodically amongst all neighbouring nodes. In this embodiment, the information is included in the hello messages.

The node monitors the received messages for receipt of hello messages (S61). When a node receives a hello message, it extracts the unique identifier (S62). As indicated above, if the node has not previously received a hello message and it has not determined that it is a sole node, then it stores the received unique identifier (S64) and continues normal operation. Where the node has already established a unique identifier, it compares (S65) the received unique identifier with the stored unique identifier. If the received unique identifier is different to the node's own previously stored unique identifier, it establishes that its current network has merged with another network having a different unique identifier. To avoid the possibility of the coexistence of two nodes with the same IP address, a new DAD process (S66) must be carried out.

In this DAD process (S66), the node sends out AREQ messages as it did before when it was initialising and expects to receive an AREP message if its address is not unique. The AREQ message further includes a NetMerge flag indicating that the AREQ message is being issued as a result of network merging and not due to a new node initialising itself In this way, as the AREQ message is passed from node to node within the network, each node is made aware that the issuing node is at the boundary with another network. In practice the boundary may not be a strictly physical boundary since a node connected to a terminal at the physical centre of a mobile network may be able to connect to nodes which the rest of the network cannot reach.

Upon receiving an AREQ message with the NetMerge flag set, a node will determine that it must carry out a DAD process for its own IP address. When a network merges with another, several nodes may note this in a short space of time and begin their own DAD process. This may result in a node receiving several AREQ messages as a result of the same network merging activity. Consequently, the node will only launch a DAD process once within a certain time period. Thus if several AREQ messages are received as a result of two networks merging, the node will not carry out repeated DAD processes. In addition, to limited congestion caused by several nodes all attempting to carry out a DAD process shortly after network merging, a random delay or jitter can be introduced before commencing the DAD process to spread the DAD traffic out over time.

Once the nodes have established that their addresses are still unique, the two merged networks can agree on a new common unique identifier for the merged network. This can be done in a number of ways. For example, when the first node detects the merging of two networks, it could decide upon a new unique identifier for the combined network and send that out as an extension to its AREQ messages during its DAD.

As the DAD process uses flooding during the merging of two networks, there is the possibility of a storm of DAD messages passing through the combined networks. This can be spread out using the jitter mentioned above. In addition, the node may record the receipt of AREQ/AREP messages. The node would keep a record of which source address the messages originated from and not forward subsequent messages which are effectively redundant. This will help to minimise the retransmission of echoes of messages previously forwarded.

Another problem which may be encountered in avoiding address conflict concerns site renumbering. If an end address changes, existing TCP connections will be broken. To enable the graceful renumbering of a site's device, preferred and deprecated addresses can be introduced. In this way, the address prior to renumbering, the deprecated address, will still be useable. However, the source address in messages sent out by the node will include the new address, the preferred address. This will only be available for a limited time to allow any outstanding messages to be received by the node.

Figure 3A:
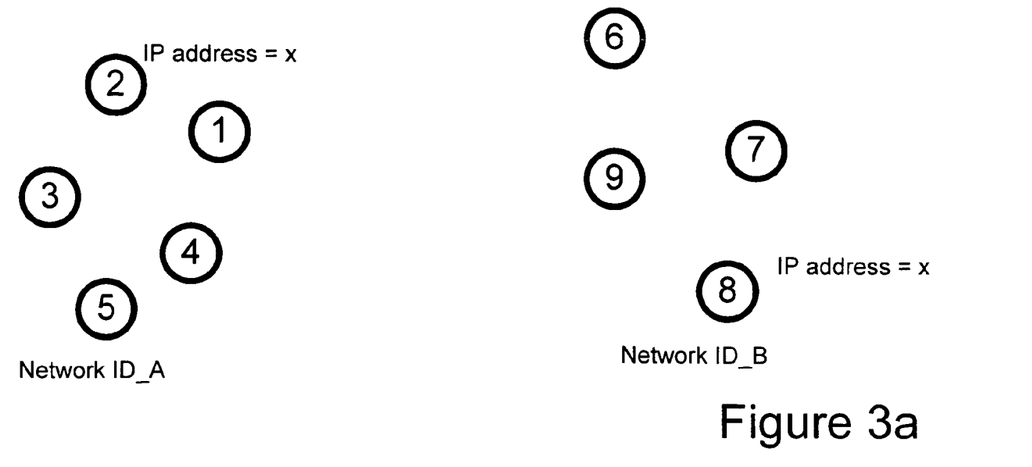
FIGS. 3a to 3c show the process of network merging taking place.
Figure 3B:
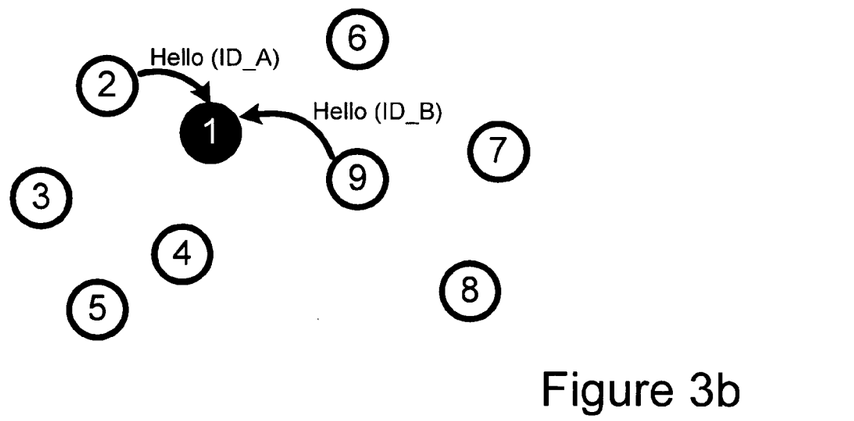

A detailed example of the process of network merging will be now be described with reference to FIGS. 3a to 3c. FIG. 3a shows two separate networks, with unique network identifiers ID_A and ID_B. The first network includes nodes 1, 2, 3, 4 and 5. The second network includes nodes 6, 7, 8 and 9. Both of nodes 2 and 8 have the same IP address, in this example the IP address=x. Whilst the networks are separated, as shown in FIG. 3a, this does not present a problem. However, if the nodes subsequently merge as shown in FIG. 3b, then a problem will arise.

As the networks merge, nodes 2 and 9 send out hello messages which can now both be received by node 1. Node 1 receives the hello message from node 2 and notes its unique network identifier, ID_A. Node 1 then receives the hello message from node 9 and notes its unique network identifier is ID_B. As these unique network identifiers are different, node 1 determines that merging has taken place.

Figure 3C:
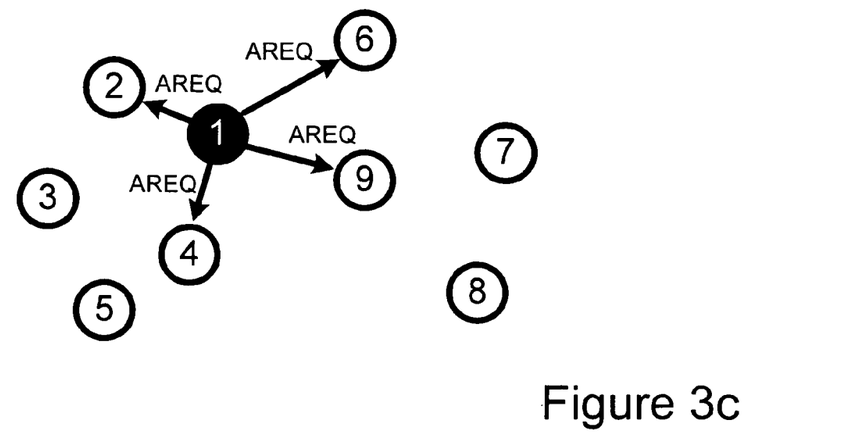

As shown in FIG. 3c, node 1 begins a DAD process to establish if its own address is still unique in the combined network. It starts by sending out an AREQ message with the NetMerge flag set. This message is received by nodes 2, 4, 6 and 9 as shown. These nodes in turn retransmit the AREQ message which is received by their respective neighbours. The AREQ message is distributed to all the nodes of the combined network. Since the address of node 1 is unique throughout both networks, no AREP messages are issued. After a suitable period, node 1 determines that its IP address is still unique and continues with normal operation. The other nodes, having received the AREQ message with the NetMerge flag set then begin their own DAD process. As indicated above, there may be a random delay before this is initiated in any given node.

Figure 4A:
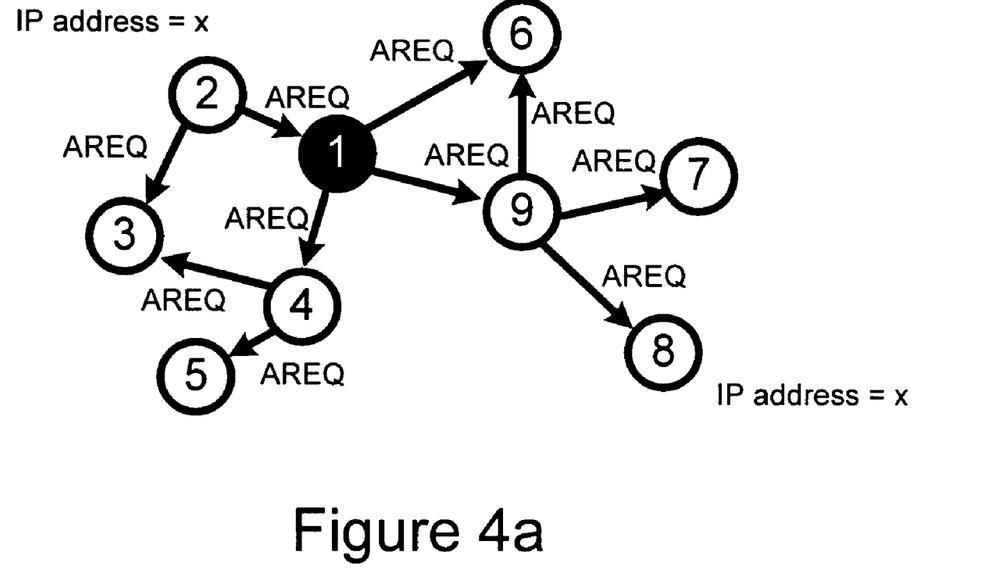
FIGS. 4a and 4b show how the process of duplicate address discovery is carried out in two merged networks.

Ultimately, node 2 will begin its own DAD process, as shown in FIG. 4a. Node 2 therefore sends out AREQ messages which are distributed through the network. This message is ultimately passed on to node 8. Node 8 notes that the address of node 2 is the same as its own and issues an AREP message. This is then transmitted and ultimately carried back to node 2 such as by the exemplary route shown in FIG. 4b. Node 2 eventually receives the AREP message and determines that its address is no longer unique. It therefore determines a new tentative address and repeats the initialisation DAD process.

Figure 4B:
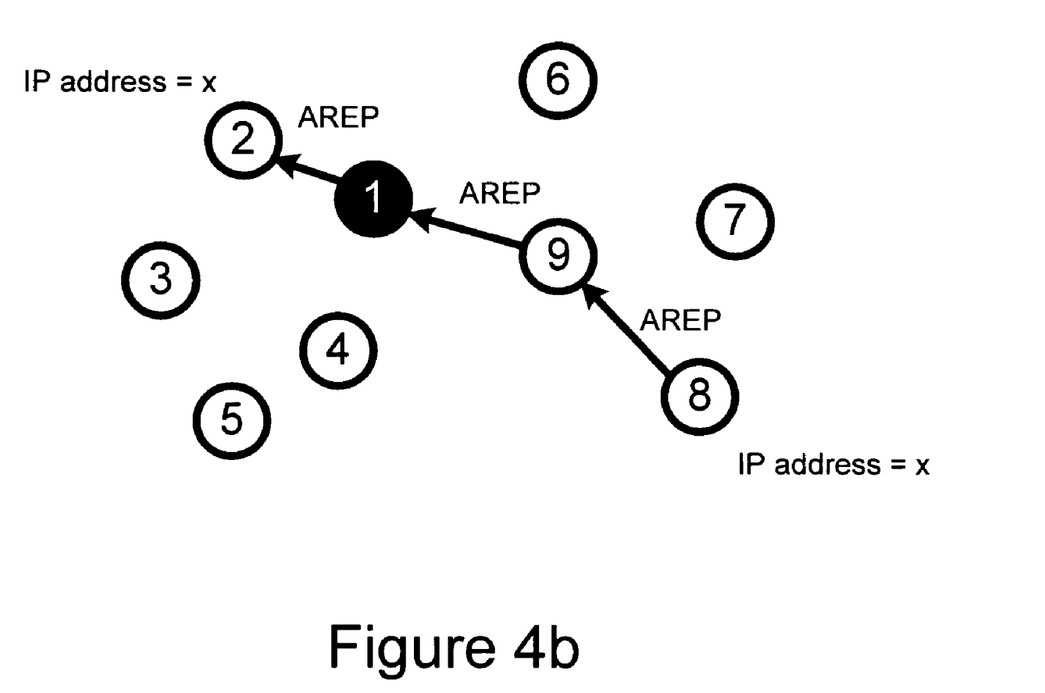

In this example, node 2 changes its address. However, node 8 may also have changed its address if it sent its own AREQ message out which node 2 replied to. In fact both nodes may change their addresses, either in response to both sending out AREP messages and/or by receiving an AREQ having the same IP address.

Figure 5A:
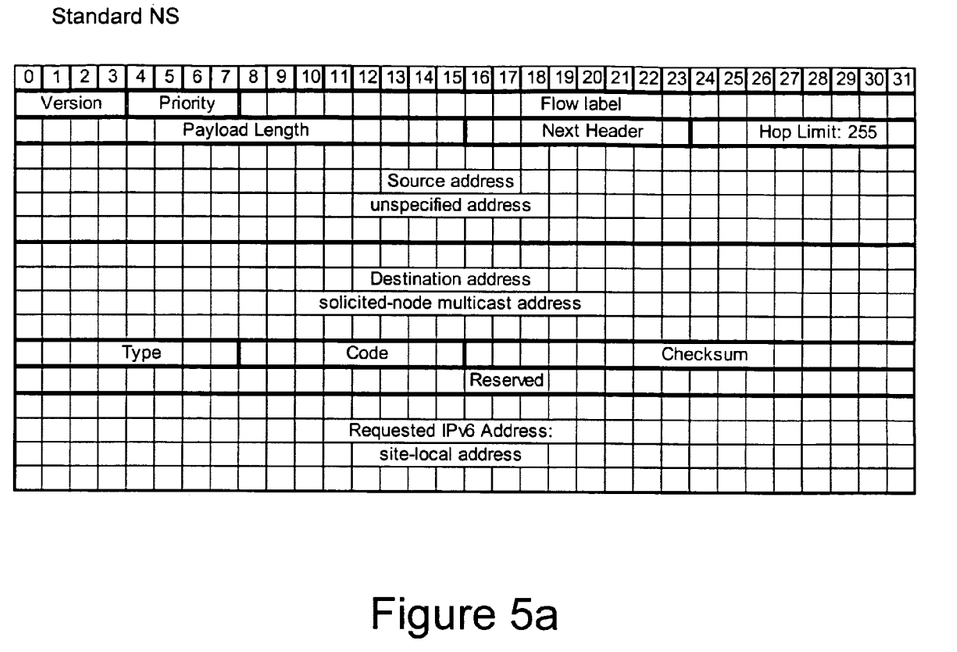
FIG. 5a shows the format of a standard neighbour solicitation message.
Figure 5B:
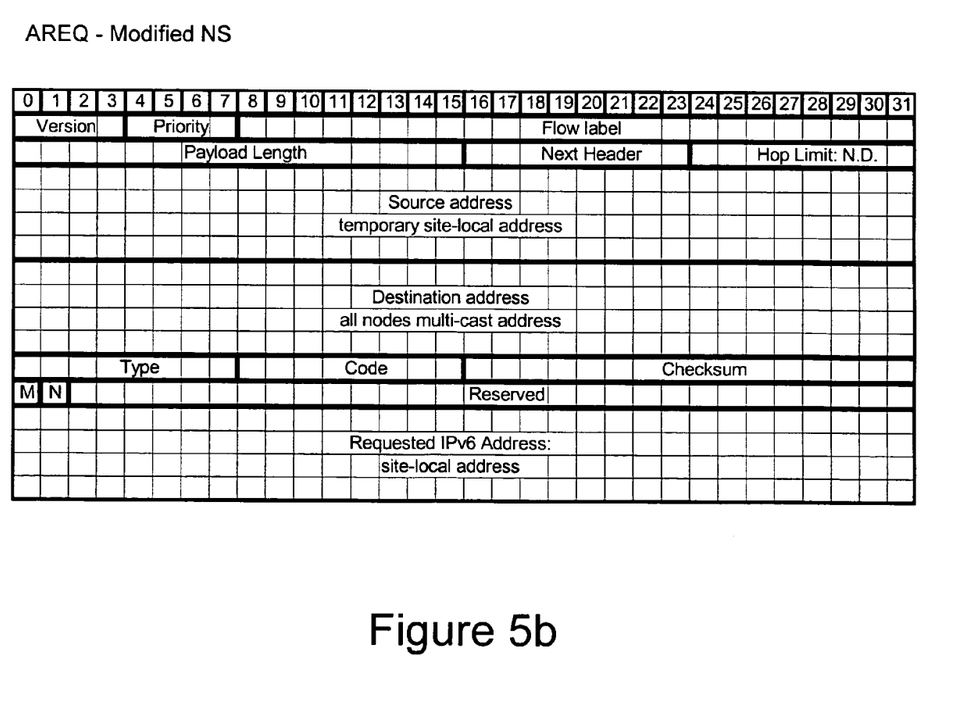
FIG. 5b shows the format of a modified neighbour solicitation message used as an address request (AREQ) message in the present invention.

A standard NS message is shown in FIG. 5a. FIG. 5b shows an example of the structure of an AREQ message of the embodiment described above. The AREQ message is a modified neighbour solicitation (NS) message, with the extra M and N flags. The M flag indicates that the NS message is a special type used for DAD. The N flag is used to indicate that the MS message is being used as part of a DAD process occurring due to the merging of two networks. The two flags are included in the reserved portion of the standard NS message. In addition, the hop limit is modified from 255 to a parameter corresponding to the diameter of the ad-hoc network to enable multi-hop connectivity. The destination address is unchanged as the 'all-nodes multicast address'. The source address is site-local and is formed with a random address with the site local prefix, the MANET_INITIAL_PREFIX (FEC0:0:0:FFFF::/96). This address is only used once during the initial test to determine whether the tentative address is unique. Although the potential number of different addresses is comparatively small, since these addresses are only used transiently to provide a return address for AREP messages to be sent to, there is relatively little chance of duplication.

When a node departs from a network, it can do so either abruptly without informing other nodes of its departure or gracefully where it does. In either case, there will be no response to further address requests from the node. As a further option, the arrangement described above may included a finite duration or lease mechanism similar to that used in DHCP. In DHCP, addresses are allocated on a timed lease which expires after a certain duration unless renewed. This avoids addresses that are not in use effectively being unavailable. Thus if the predetermined time for a node expires and no updating messages (e.g. hello messages) have been received from the node then its neighbours can assume that it has moved out of the network range or the node is down.

The invention claimed is:

1. A method for controlling a node in a network comprising:
   storing a network identifier indicative of the network which the node is associated with;
   receiving messages from other nodes and extracting network identifiers from said messages indicative of the network which the sending node is associated with;
   comparing the received network identifier with the stored network identifier;
   carrying out a duplicate address detection process when the stored network identifier is different than the received network identifier;
   receiving an address request message transmitted from a second node and determining whether such message includes a flag to indicate that a duplicate address detection process is being carried out by the second node as a result of the second node having received a network identifier different than a network identifier stored by it; and
   initiating a duplicate address detection process in response to the receipt of an address request message including said flag,
   wherein the start of the duplicate address detection process is deferred for a period of time; and
   wherein the period of time is determined at random.

2. A method for controlling a node in a network comprising:
   storing a network identifier indicative of the network which the node is associated with;
   receiving messages from other nodes and extracting network identifiers from said messages indicative of the network which the sending node is associated with;
   comparing the received network identifier with the stored network identifier;
   carrying out a duplicate address detection process when the stored network identifier is different than the received network identifier;
   receiving an address request message transmitted from a second node and determining whether such message includes a flag to indicate that a duplicate address detection process is being carried out by the second node as a result of the second node having received a network identifier different than a network identifier stored by it; and
   initiating a duplicate address detection process in response to the receipt of an address request message including said flag,
   wherein after a duplicate address detection process has been initiated in response to the receipt of an address request message including said flag, address request messages which are received for a period of time thereafter do not initiate a duplicate address detection process.

3. A method for controlling a node in a network comprising:
   storing a network identifier indicative of the network which the node is associated with;
   receiving messages from other nodes and extracting network identifiers from said messages indicative of the network which the sending node is associated with;
   comparing the received network identifier with the stored network identifier;
   carrying out a duplicate address detection process when the stored network identifier is different than the received network identifier;
   receiving an address request message transmitted from a second node and determining whether such message includes a flag to indicate that a duplicate address detection process is being carried out by the second node as a result of the second node having received a network identifier different than a network identifier stored by it; and
   retransmitting received address request messages for reception by other nodes.

4. A method according to claim 3, further comprising:
   noting the receipt of an address request message and storing a record of the address of the node from which the message originated and preventing retransmission of address request messages where an address request message originating from the same node has already been forwarded.

5. A method for controlling a node in a network comprising:
   storing a network identifier indicative of the network which the node is associated with;
   receiving messages from other nodes and extracting network identifiers from said messages indicative of the network which the sending node is associated with;
   comparing the received network identifier with the stored network identifier;
   carrying out a duplicate address detection process when the stored network identifier is different than the received network identifier;
   generating the network identifier itself; and
   waiting for a predetermined period of time to establish if any messages containing a network identifier are received from another node and if no such message is received carrying out the generating step.

6. A terminal for connecting to a network to form a node comprising:
   a memory for storing a network identifier indicative of the network which the node is associated with;
   a receiver for receiving messages from other nodes and extracting from said messages a network identifier indicative of the network which the sending node is associated with;
   a comparator for comparing a received network identifier with the stored network identifier; and
   a controller for carrying out a duplicate address detection process when the comparator indicates that the stored network identifier is different than the received network identifier.

7. A terminal according to claim 6 wherein, during said duplicate address detection process, said controller sends an address request message for reception by other nodes, wherein said address request message includes a flag to indicate that the duplicate address detection process being carried out by the controller is as a result of a received network identifier being different than the stored network identifier.

8. A terminal according to claim 6 wherein said receiver additionally monitors received messages to determine if an address request message transmitted from a second node is received which includes a flag to indicate that a duplicate address detection process is being carried out by the second node as a result of the second node having received a network identifier different than a network identifier stored by it.

9. A terminal according to claim 8 wherein said controller initiates a duplicate address detection process in response to the receipt of an address request message including said flag.

10. A terminal according to claim 9 wherein the start of the duplicate address detection process is deferred for a period of time.

11. A terminal according to claim 10 wherein the period of time is determined at random.

12. A terminal according to claim 9 wherein after a duplicate address detection process has been initiated by said controller in response to the receipt of an address request message including said flag, said controller inhibits the initiation of any further duplicate address detection process in response to address request messages received for a period of time thereafter.

13. A terminal according to claim 8, further comprising a transmitter for retransmitting received address request messages for reception by other nodes.

14. A terminal according to claim 13, wherein said memory is also adapted to store a record of the address of the node from which an address request message originated and wherein said transmitter is inhibited from retransmitting received address request messages where an address request message originating from the same node has already been received and stored in said memory.

15. A terminal according to claim 6, further comprising an extractor for obtaining a network identifier from a message received from another node and storing the network identifier in the memory.

16. A terminal according to claim 6, further comprising a generator for generating a network identifier and storing the network identifier in the memory.

17. A terminal according to claim 6, further comprising:
an extractor for obtaining a network identifier from a message received from another node and storing the network identifier in the memory; and
a generator for generating a network identifier,
wherein the generator waits for a predetermined period of time to establish if the extractor has received any messages containing a network identifier and if no such message is received generates a network identifier and stores the network identifier in the memory.

* * * * *